(12) United States Patent
Villarreal Suarez

(10) Patent No.: US 11,786,425 B2
(45) Date of Patent: Oct. 17, 2023

(54) SYSTEMS INCORPORATING A WHEELCHAIR WITH AN EXOSKELETON ASSEMBLY AND METHODS OF CONTROLLING THE SAME

(71) Applicant: Toyota Motor North America, Inc., Plano, TX (US)

(72) Inventor: Dario Jose Villarreal Suarez, Farmers Branch, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 762 days.

(21) Appl. No.: 16/916,960

(22) Filed: Jun. 30, 2020

(65) Prior Publication Data
US 2021/0401644 A1 Dec. 30, 2021

(51) Int. Cl.
*A61G 5/14* (2006.01)
*A61G 5/06* (2006.01)
(Continued)

(52) U.S. Cl.
CPC ............ *A61G 5/14* (2013.01); *A61G 5/027* (2013.01); *A61G 5/041* (2013.01); *A61G 5/068* (2013.01);
(Continued)

(58) Field of Classification Search
CPC ...... A61G 5/14; A61H 3/00; A61H 2003/007; B62J 9/0006
See application file for complete search history.

(56) References Cited

U.S. PATENT DOCUMENTS

| | | | | |
|---|---|---|---|---|
| 9,849,048 | B2* | 12/2017 | Borisoff | A61G 5/14 |
| 2018/0221226 | A1* | 8/2018 | Moore | A61G 5/128 |
| 2019/0282423 | A1* | 9/2019 | Nam | B25J 9/0006 |

FOREIGN PATENT DOCUMENTS

| | | |
|---|---|---|
| CN | 107625589 A | 1/2018 |
| CN | 109512644 A | 3/2019 |

(Continued)

OTHER PUBLICATIONS

Vittorio M.N. Passaro, "A Method to Accurately Estimate the Muscular Torques of Human Wearing Exoskeletons by Torque Sensors", Sep. 4, 2015, 21 pages, https://www.mdpi.com/1424-8220/15/4/8337/html.

(Continued)

*Primary Examiner* — Kevin Hurley
*Assistant Examiner* — Harold Eric Pahlck, III
(74) *Attorney, Agent, or Firm* — Dinsmore & Shohl LLP

(57) ABSTRACT

Embodiments described herein are directed to a wheelchair system that includes a wheelchair and an exoskeleton. The wheelchair includes a frame, a pair of armrests coupled to the frame, and a control unit. The pair of armrests movable between an attached position and a detached position. When in the attached position, each one of the pair of armrests are coupled to the frame and when in the detached position, each one of the pair of armrests is removed from the frame. The exoskeleton is communicatively coupled to the control unit via a cable extending between the exoskeleton and the control unit. The exoskeleton being releasably coupled to at least a portion of the frame of the wheelchair. The wheelchair system is translatable between a wheelchair mode and an exoskeleton mode such that, when in the exoskeleton mode, the control unit provides electrical power and control signals to the exoskeleton.

20 Claims, 7 Drawing Sheets

(51) Int. Cl.
  *A61G 5/12* (2006.01)
  *A61G 5/02* (2006.01)
  *B25J 9/00* (2006.01)
  *A61G 5/04* (2013.01)
  *A61H 3/00* (2006.01)

(52) U.S. Cl.
  CPC .............. *A61G 5/125* (2016.11); *A61H 3/00* (2013.01); *B25J 9/0006* (2013.01); *A61G 2203/10* (2013.01); *A61H 2003/006* (2013.01); *A61H 2003/007* (2013.01)

(56) References Cited

FOREIGN PATENT DOCUMENTS

| CN | 110897800 A | 3/2020 |
|---|---|---|
| WO | 2017093830 A1 | 6/2017 |

OTHER PUBLICATIONS

Zhibin Song, et al., "Mechanism Design and Analysis of a Proposed Wheelchair-Exoskeleton Hybrid Robot for Assisting Human Movement", Jul. 1, 2019, 14 pages, https://www.mech-sci.net/10/11/2019/.

* cited by examiner

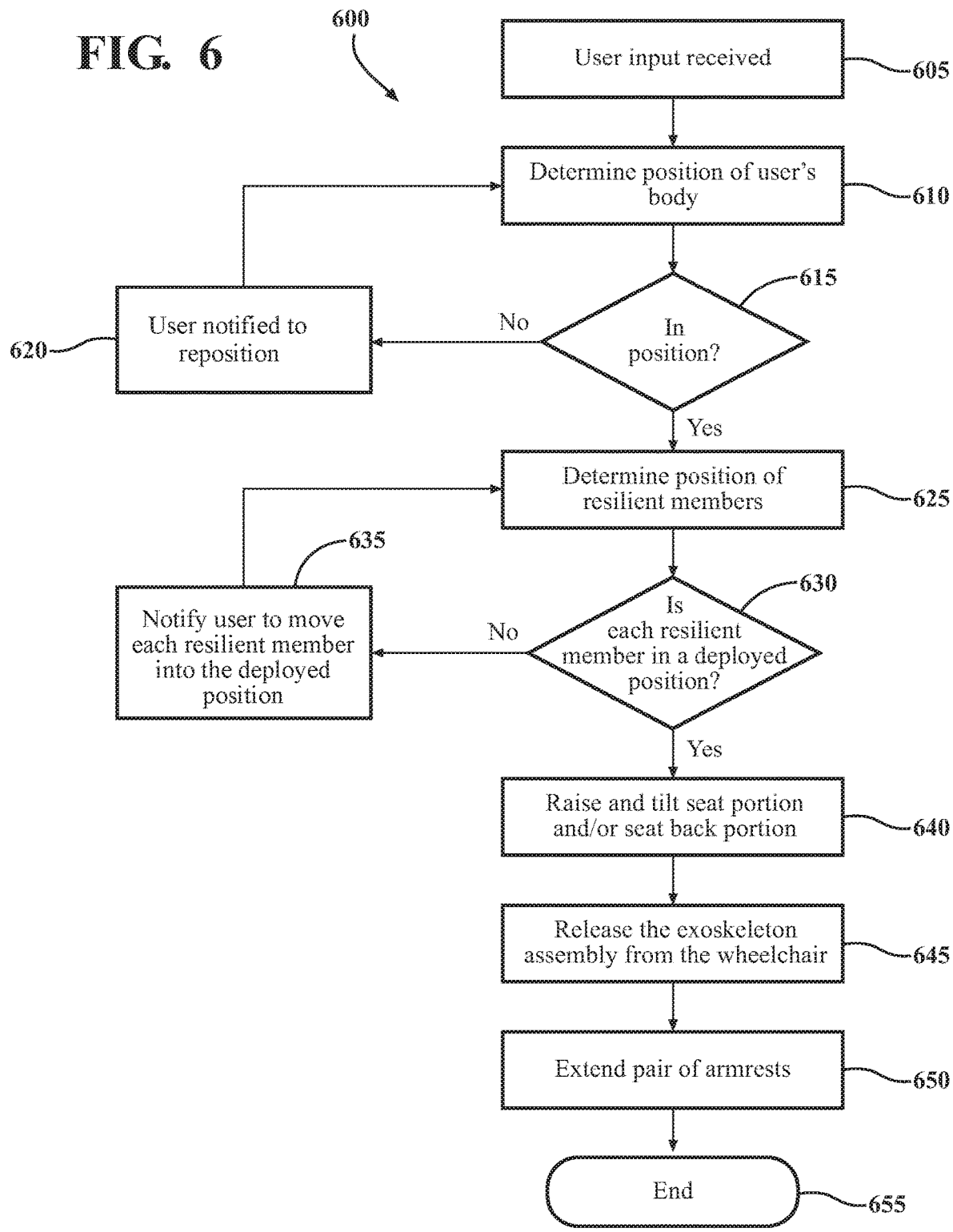

SYSTEMS INCORPORATING A WHEELCHAIR WITH AN EXOSKELETON ASSEMBLY AND METHODS OF CONTROLLING THE SAME

TECHNICAL FIELD

The present disclosure generally relates to personal mobility systems and, more specifically, to systems that incorporate a wheelchair with an exoskeleton assembly to assist a user in standing.

BACKGROUND

A user of a power wheelchair may desire to stand with assistance that is independent from the power wheelchair. An exoskeleton may allow for such standing assistance, but are bulky, require independent on board power sources, and do not integrate with the power wheelchair.

SUMMARY

In one aspect, a wheelchair system includes a wheelchair and an exoskeleton. The wheelchair includes a frame, a pair of armrests coupled to the frame, and a control unit. The pair of armrests movable between an attached position and a detached position. When in the attached position, each one of the pair of armrests are coupled to the frame and when in the detached position, each one of the pair of armrests is removed from the frame. The exoskeleton is communicatively coupled to the control unit via a cable extending between the exoskeleton and the control unit. The exoskeleton being releasably coupled to at least a portion of the frame of the wheelchair. The wheelchair system is translatable between a wheelchair mode and an exoskeleton mode such that, when in the exoskeleton mode, the control unit provides electrical power and control signals to the exoskeleton such that the exoskeleton assists a user in standing away from the wheelchair.

In another aspect, a wheelchair system includes a wheelchair and an exoskeleton. The wheelchair includes a frame and a control unit. The exoskeleton is communicatively coupled to the control unit via a cable extending between the exoskeleton and the control unit. The exoskeleton being releasably coupled to at least a portion of the frame of the wheelchair. The exoskeleton includes an upper body portion positioned on an upper body of the user, an upper leg portion positioned on an upper leg of the user, and at least one actuator. The upper body portion is positioned on an upper body of the user. The upper leg portion is positioned on an upper leg of the user. The at least one actuator is positioned between the upper body portion and the upper leg portion. The at least one actuator is positioned between the upper body device and the upper leg device. The at least one actuator acts as a joint to assist in moving the upper leg portion with respect to the upper body portion such that the user may stand away from the wheelchair. The wheelchair system is translatable between a wheelchair mode and an exoskeleton mode such that, when in the exoskeleton mode, the control unit provides electrical power and control signals to the exoskeleton and the exoskeleton assists a user in standing independent of the wheelchair.

In yet another aspect, a method of controlling a wheelchair system between a wheelchair mode and an exoskeleton mode includes receiving, by a control unit, an input from a user, the input corresponding to a particular function, causing, by a processing device, a wheelchair to move into an exoskeleton use position and detaching, by the user, a pair of armrests from a frame of wheelchair. The method continues by causing, by the processing device, at least one actuator of an exoskeleton to move to assist the user in standing and the exoskeleton is tethered to the wheelchair via a cable such that the wheelchair supplies a power to the at least one actuator of the exoskeleton.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6 graphically depicts a flowchart of an example method of controlling a wheelchair system between a wheelchair mode and an exoskeleton mode.

DETAILED DESCRIPTION

The systems and methods described herein generally relate to a wheelchair system having with a wheelchair and an exoskeleton assembly in which the wheelchair and the exoskeleton assembly are translatable between a wheelchair mode and an exoskeleton mode. The wheelchair includes a pair of armrests that are movable between an attached position in which the pair of arm rests are coupled to the wheelchair and a detached position in which the pair of arm rests assist the user in standing. In the wheelchair mode, the wheelchair system is a wheelchair. In the exoskeleton mode, the user is able to utilize an exoskeleton independent from the wheelchair to stand and/or to perform a plurality of standing tasks using a power source and control unit of the wheelchair. The exoskeleton assembly may further include an upper body portion, an upper leg portion, a lower leg portion, at least one actuator, and the pair of armrests. When using the exoskeleton assembly, the user may actuate the exoskeleton assembly using the control unit and power supply of the wheelchair to limit the bulkiness, the weight, and the amount of components required for the exoskeleton assembly.

Present wheelchairs do not have exoskeleton assemblies that may use existing power supply and control units of the wheelchair to assist the user in performing the plurality of standing tasks. As such, present exoskeletons are big, bulky, heavy, and the like. As a non-limiting example, the user may wish to stand to reach an object that could not be otherwise reached with the user seated in the power wheelchair. Without an aid, the user may not be able to stand, lose their balance and fall, take several attempts to stand, and the like.

Various embodiments of power wheelchairs configured with exoskeleton assemblies that are movable between a wheelchair mode and an exoskeleton mode to assist a user in performing a plurality of standing tasks are described in detail herein.

As used herein, the term "communicatively coupled" may mean that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

Figure 1:
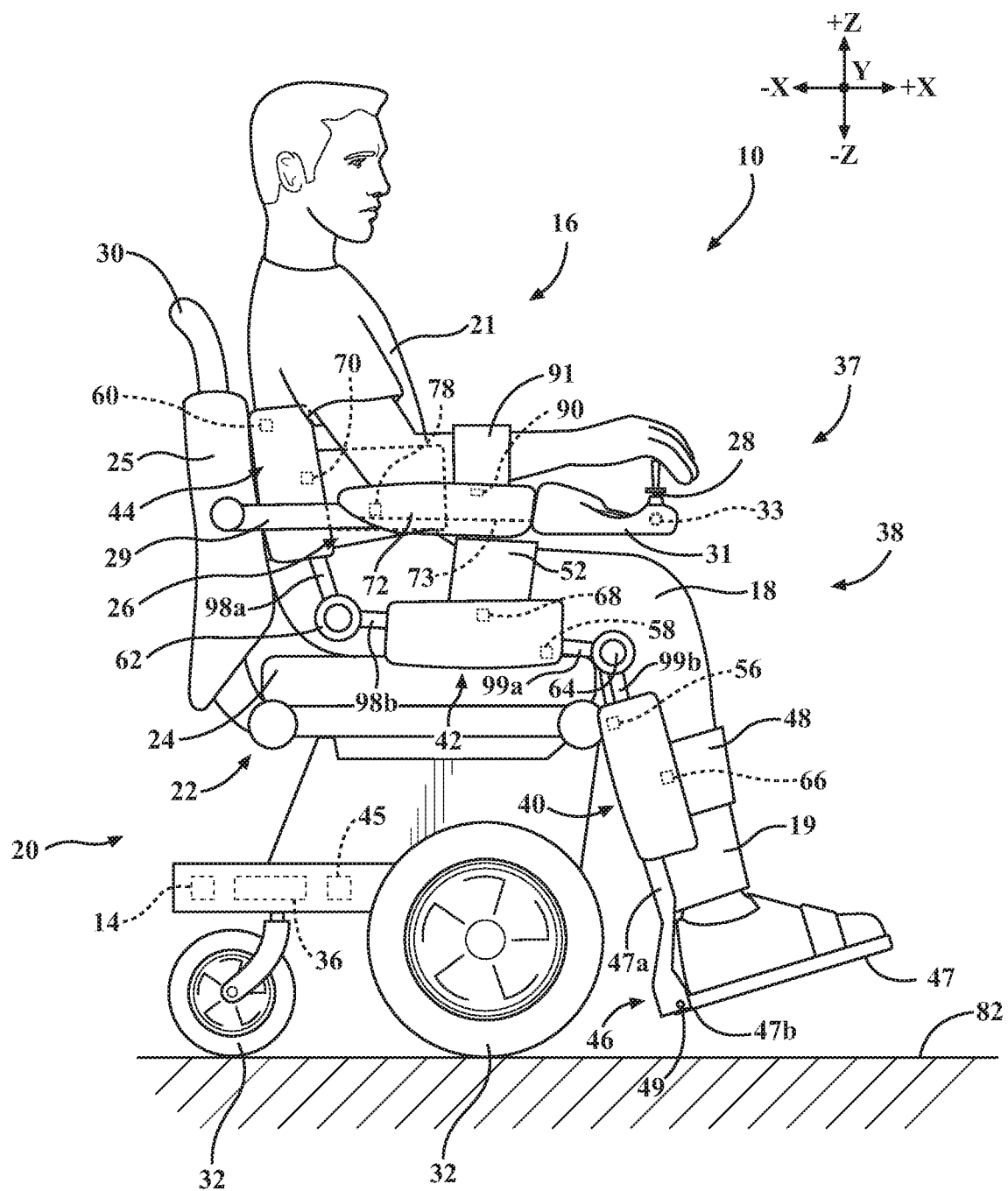
FIG. 1 schematically depicts a side view of an example wheelchair system having a wheelchair and an exoskeleton assembly according to one or more embodiments described and illustrated herein.

As used herein, the term "system longitudinal direction" refers to the forward-rearward direction of the system (i.e., in a +/−X direction of the coordinate axes depicted in FIG. 1). The term "system lateral direction" refers to the cross-direction (i.e., along the Y axis of the coordinate axes depicted in FIG. 1), and is transverse to the longitudinal direction. The term "system vertical direction" refers to the upward-downward direction of the system (i.e., in the +/−Z direction of the coordinate axes depicted in FIG. 1).

Referring initially to FIGS. 1-4, a schematic depiction of an example wheelchair system, generally designated 10, is provided. The wheelchair system 10 generally includes a wheelchair 12 and an exoskeleton assembly 37. The wheelchair 12 includes a control unit 14. In some embodiments, the wheelchair 12 is a powered wheelchair that includes motorized components that allow a user 16 to electronically control movement of the wheelchair. In other embodiments, the wheelchair 12 may be human powered or manually advanced in travel. Accordingly, various components of the wheelchair 12 should be understood and are not described in further detail herein.

The wheelchair 12 may have a plurality of components that are integrated therewith or may be a modular wheelchair that accepts various components based on a particular user's needs. For example, components such as leg rests, arms, wheels, backs, head rests, adapters for certain components, and/or the like may be modular and added to the wheelchair 12 as needed. Other modular components should generally be understood and are included within the scope of the present disclosure.

In some embodiments, the wheelchair 12 may include a base 20, a frame 22, a seat 24, and a seat back 25. The frame 22 is supported by the base 20 and supports the seat 24 and the seat back 25. In some embodiments, the seat 24 and the seat back 25 are arranged on the frame 22 such that the seat 24 is transversely positioned relative to the seat back 25. Thus, the frame 22 is generally positioned below the seat 24 in a system vertical direction (i.e., positioned in the −Z direction of the coordinate axes of FIG. 1 relative to the seat 24) and the base 20 is generally positioned below the frame 22 in a system vertical direction (i.e., positioned in the −Z direction of the coordinate axes of FIG. 1 relative to the frame 22).

The frame 22 may further include a footrest assembly 46 that includes an elongated member 47a that is hingedly and/or pivotally coupled to a foot support 47b at pivot portion 49. It should be appreciated that the length of the elongated member 47a may adjust mechanically by a tension member, such as a spring, and/or electrically, to accommodate for a plurality of heights and/or a plurality of weights of users. That is, the length of the legs of the user 16 may apply a pressure or a force onto the foot support 47b, which extends a tension member is the system vertical direction (i.e., in the +/−Z direction) to accommodate the length of the legs of the user 16. Further, it should be appreciated that the length, width, angle, tilt, and the like of the foot support 47b may adjust mechanically by a tension member, such as a spring, and/or electrically, to accommodate for a plurality of sizes and/or a plurality of weights of users. Further, in some embodiments, the footrest assembly 46 may not be used to support feet of the user and instead the feet of the user are in contact with a surface 82, such as a ground or a floor, so that the user 16 may stand to perform a plurality of standing tasks, such as reaching the object, as discussed in greater detail herein.

Figure 2:
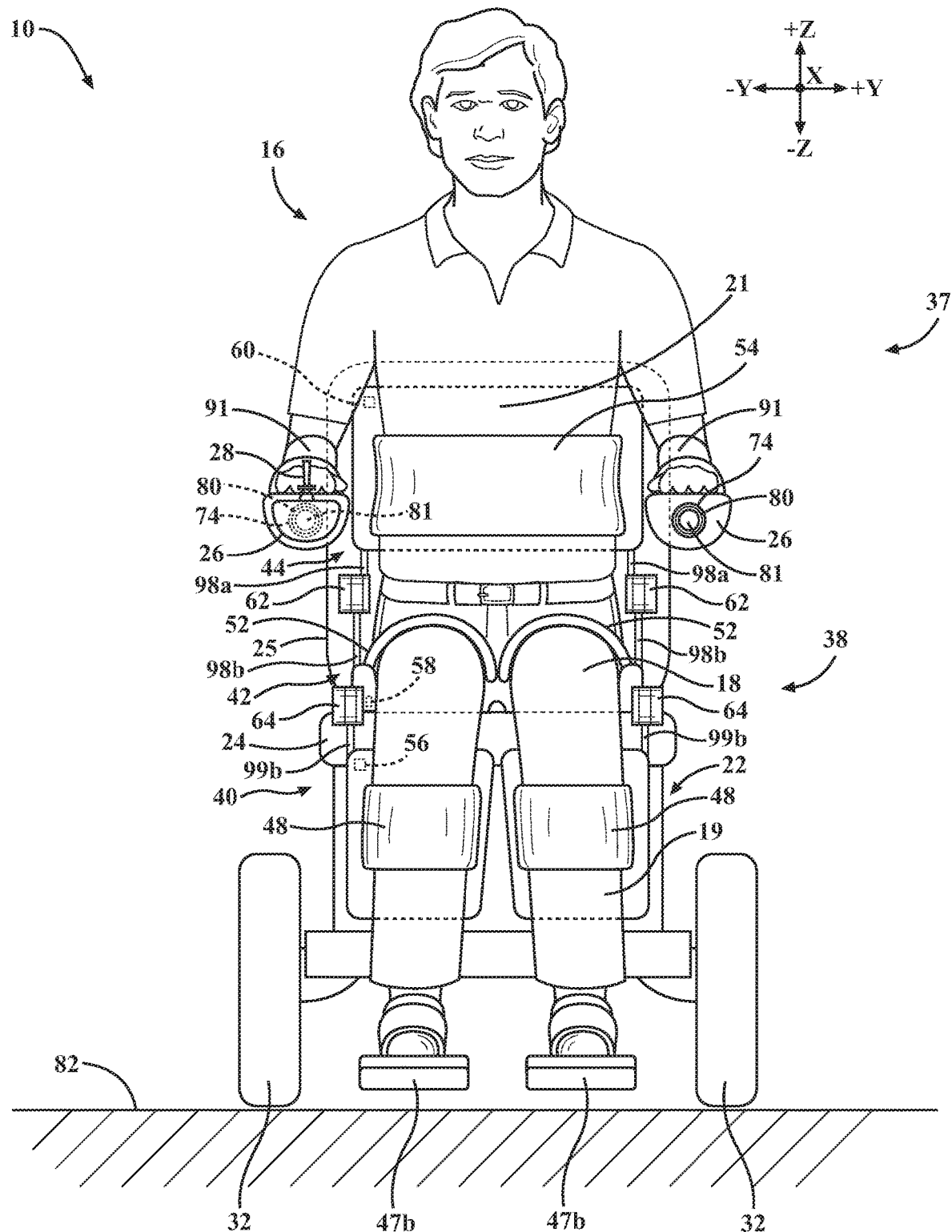
FIG. 2 schematically depicts a front view of the example wheelchair system of FIG. 1 according to one or more embodiments described and illustrated herein.
Figure 3:
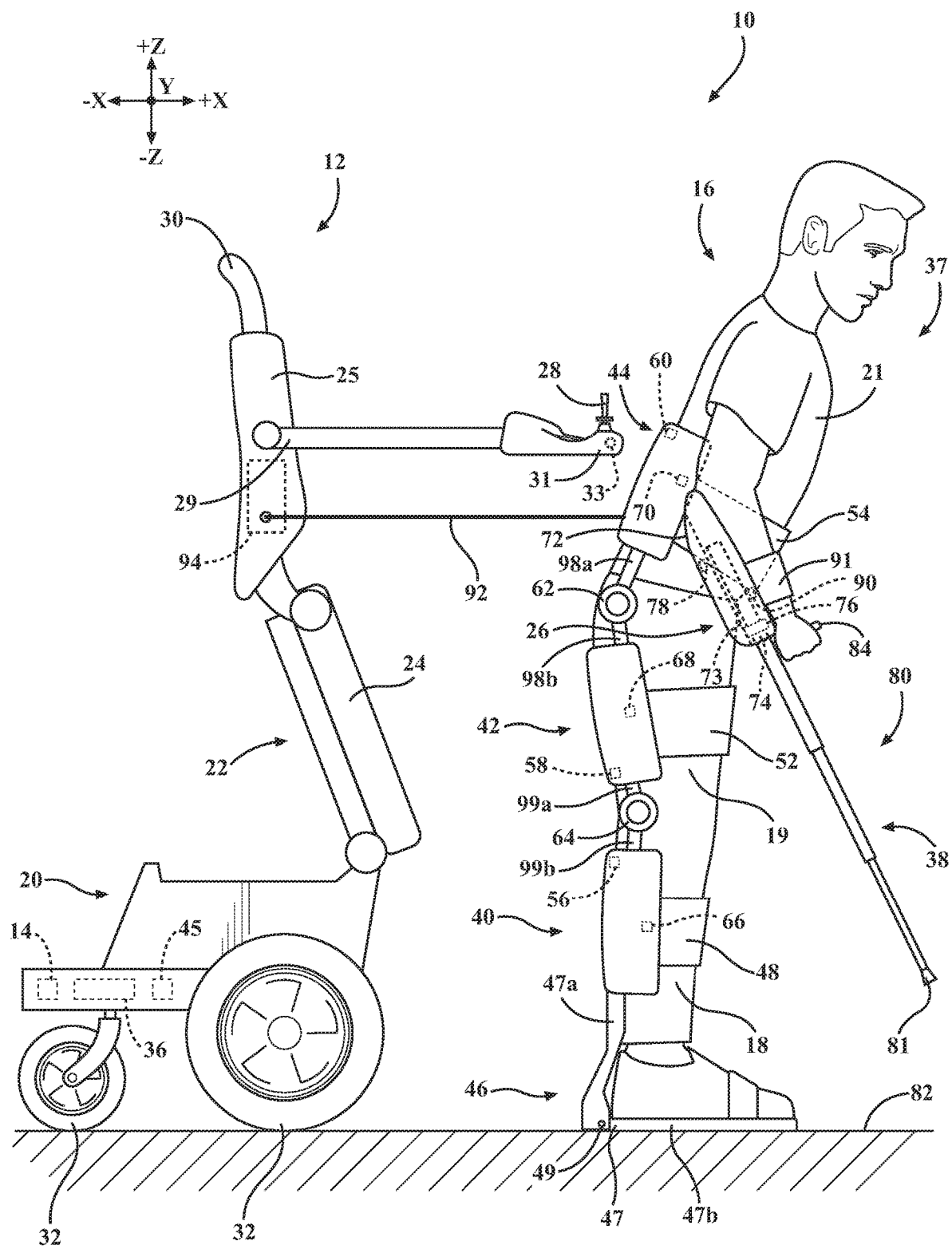
FIG. 3 schematically depicts a side view of the example wheelchair system of FIG. 1 in an exoskeleton mode according to one or more embodiments described and illustrated herein.
Figure 4:
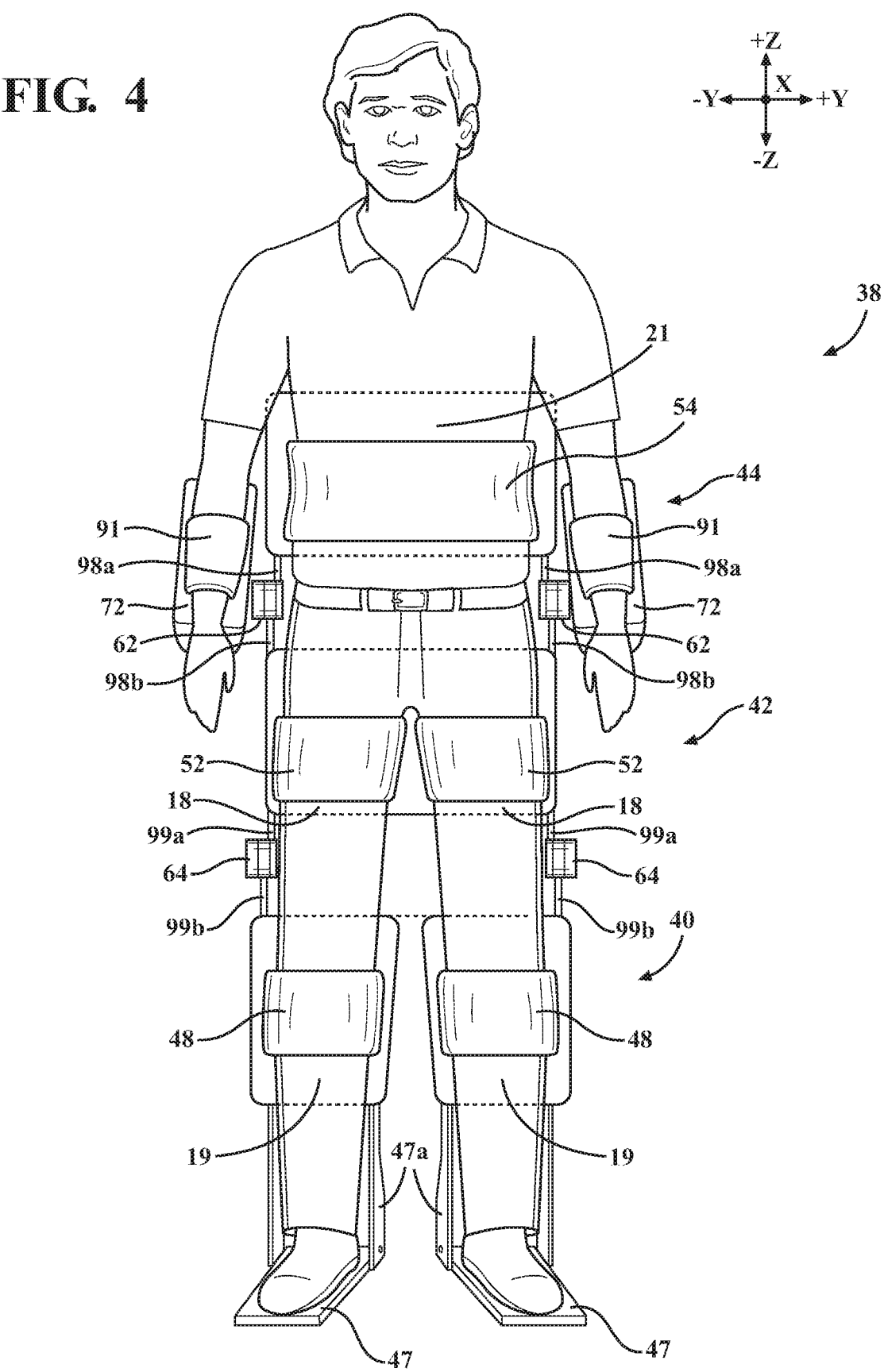
FIG. 4 schematically depicts an isolated front view of the exoskeleton assembly of the example wheelchair system of FIG. 1 in an exoskeleton mode according to one or more embodiments described and illustrated herein.

Still referring to FIGS. 1-4, in some embodiments, the frame 22, the seat 24, and the seat back 25 are generally configured to support the user 16 when the user 16 is seated in the wheelchair 12. In some embodiments, the frame 22 may further include a pair of armrests 26 that are each releasably coupled to the frame 22, as discussed in greater detail herein. That is, each one of the pair of armrests 26 are moveable between an attached position where each one of the pair of armrests 26 are coupled to the frame 22, as shown in FIGS. 1-2 and a detached position where each one of the pair of armrests 26 are removed from the frame 22 to be independent from the frame 22, as best shown in FIGS. 3-4, and as described in greater detail herein. Further, the frame 22 and/or the seat back 25 may include an elongated member 29 that extends from the frame 22 and/or the seat back 25 in the system longitudinal direction (e.g., in the +X direction). The hand rest 31 that may have a user interface device 28 coupled thereon is coupled to the elongated member 29. The hand rest 31 may be positioned forward of the pair of armrests 26 in the system longitudinal direction (i.e., in the +/−X direction). It should be appreciated that that one of the pair of armrests 26 is positioned between the frame 22 and/or seat back 25 and the hand rest 31 along the elongated member 29, as discussed in greater detail herein. It should also be appreciated that the hand rest 31 may remain coupled to the frame 22 during the exoskeleton mode when the pair of armrests 26 are detached or removed from the frame. As such, access to the user interface device 28 is permitted in the exoskeleton mode should the user 16 wish or need to move the wheelchair 12. However, it should be understood that in some embodiments, the wheelchair 12 may not have the hand rest 31 and the user interface device 28 may be coupled to another portion of the wheelchair 12, such as the frame 22, the seat 24 and the like.

As described herein, the user interface device 28 may translate inputs from the user 16 into electrical signals that are usable to control movement of the wheelchair 12. For example, the user interface device 28 may be a joystick-type controller where the user 16 directs the joystick in accordance with a desired direction and/or speed of travel.

Accordingly, the user interface device 28 may be communicatively coupled to the base 20, including various components thereof, to transmit signals to the base 20 to cause the wheelchair 12 to respond according to the inputs received by the user interface device 28. It should be understood that the joystick configuration is merely illustrative, and in some embodiments, the user interface device 28 may utilize other designs, such as buttons, switches, voice controls, breath controls, and/or the like to receive inputs from a user 16 via a user interface and the like.

In some embodiments, the seat back 25 may include one or more handles 30 integrated therein or coupled thereto. The one or more handles 30 may provide an area for a user (e.g., a caregiver) to grip the wheelchair 12. For example, at least one of the one or more handles 30 may be located on a back portion of the seat back 25 such that a user may grasp the one or more handles 30 when moving behind the wheelchair 12.

An exoskeleton assembly 37 may include the pair of armrests 26 in the detached position and an exoskeleton 38. The exoskeleton 38 may include an upper body device 44 coupled to an upper body 21 of the user 16, (e.g., a hip, a stomach, a chest and/or a back portion) an upper leg device 42 coupled to an upper leg 18 of the user 16 and a lower leg device 40 coupled to a lower leg 19 of the user 16. As such, the exoskeleton 38 may generally be any system, device, or collection of devices that assist the user 16 with one or more movements. For example, the exoskeleton 38 may be a device that assists the user 16 with one or more upper extremity movements and/or one or more the lower extremity movements to assist the user in standing and performing a plurality of standing tasks independent from the wheelchair 12. The exoskeleton 38 and/or portions of the components thereof may be releasably coupled to the frame 22, as discussed in greater detail herein. As such, these portions of the exoskeleton 38 are formed so that each portion is complimentary to the frame 22 (i.e., so that the portions of the exoskeleton 38 fit together into an integral manner with the frame 22 or other components of the wheelchair 12, such as with the seat 24, the seat back 25, the footrest 47, the pair of armrests 26, and the like), but are still removable from the wheelchair 12. In other embodiments, the exoskeleton assembly 37 is an add-on feature (e.g., an aftermarket component that is couplable to the frame 22).

In some embodiments, the exoskeleton 38 may be an orthopedic device that replaces a missing joint or bone or a device that supports a damaged bone. While the present disclosure depicts the exoskeleton 38 as being located at the upper leg 18 of the user 16, at the lower leg 19 of the user 16, and at the upper body 21 of the user 16, it should be understood that this is merely illustrative. As such, the present disclosure is not limited to exoskeletons that have upper leg portions, lower leg portions, and hip, stomach, chest and/or back portions. Moreover, while only a single exoskeleton 38 is depicted, the present disclosure is not limited to such. That is, a plurality of exoskeletons may be utilized in a similar manner (e.g., one for the legs of the user 16 and another for an upper body of the user 16, and the like) without departing from the scope of the present disclosure. Various components, features, and uses of exoskeletons should generally be understood. As such, only particular details of the exoskeleton assembly 37 will described in further detail herein.

In some embodiments, the lower leg device 40 is coupled to the lower leg 19 of the user 16 via at least one lower leg member 48. For example, the at least one lower leg member 48 may be a strap, an elastic band, a belt, a rigid bracket, and the like. As such, the least one lower leg member 48 is movable between a deployed position, where the least one lower leg member 48 is positioned over the lower leg 19 of the user 16 and an opposite retracted position. It should be appreciated that the lower leg device 40 may be releasably coupled to the frame 22 and/or to the seat 24 via a lower leg release mechanism 56. In some embodiments, the lower leg release mechanism 56 may be a mechanical device such as a catch, a lever, hook and loop fastener, and/or the like, to release and/or couple the lower leg device 40 to the wheelchair 12. In other embodiments, the lower leg release mechanism 56 may be an electro-mechanical device, pneumatic device, and the like, that are controlled by the control unit 14 such that the lower leg release mechanism 56 releases and/or couples the lower leg device 40 to the wheelchair 12 without actual physical human contact with the lower leg release mechanism 56. Further, it should be understood that the lower leg device 40 may be a portion of, and/or integrally formed with the footrest assembly 46 and coupled to the frame 22 and/or seat 24.

In some embodiments, the upper leg device 42 may be coupled to the upper leg 18 of the user 16 via at least one upper leg resilient member 52. For example, the at least one upper leg member 52 may be a strap, an elastic band, a belt, a rigid bracket, and the like. As such, the least one upper leg member 52 is movable between a deployed position, where the least one upper leg member 52 is positioned over the upper leg 18 of the user 16 and an opposite retracted position. It should be appreciated that the upper leg device 42 may be releasably coupled to the frame 22 and/or to the seat 24 via an upper leg release mechanism 58. In some embodiments, the upper leg release mechanism 58 may be a mechanical device such as a catch, a lever, hook and loop fastener, and/or the like, to release and/or couple the upper leg device 42 to the wheelchair 12. In other embodiments, the upper leg release mechanism 58 may be an electro-mechanical device, pneumatic device, and the like, that are controlled by the control unit 14 such that the upper leg release mechanism 58 releases and/or couples the upper leg device 42 to the wheelchair 12 without actual physical human contact with the upper leg release mechanism 58.

In some embodiments, the upper body device 44 may be a vest that includes a portion of, and/or is complementary formed with the seat back 25, as discussed in greater detail herein. The upper body device 44 may be coupled to the upper body 21 of the user 16 via at least one upper body member 54. For example, the at least one upper body member 54 may be a strap, an elastic band, a belt, a rigid bracket, and the like. As such, the at least one upper body member 54 is movable between a deployed position, where the least one upper body member 54 is positioned over a portion of the upper body 21 of the user 16 and an opposite retracted position. It should be appreciated that the upper body device 44 may be releasably coupled to the frame 22 and/or to the seat back 25 via an upper body release mechanism 60. In some embodiments, the upper body release mechanism 60 may be a mechanical device such as a catch, a lever, hook and loop fastener, and/or the like, to release and/or couple the upper body device 44 to the wheelchair 12. In other embodiments, the upper body release mechanism 60 may be an electro-mechanical device, pneumatic device, and the like, that are controlled by the control unit 14 such that the upper body release mechanism 60 releases and/or couples the upper body device 44 to the wheelchair 12 without actual physical human contact with the upper body release mechanism 60.

Still referring to FIGS. 1 and 3, the exoskeleton 38 further includes a first actuator 62, a second actuator 64, a lower leg position sensor 66, an upper leg position sensor 68, and an upper body position sensor 70. In some embodiments, the first actuator 62 is positioned between the upper body device 44 and the upper leg device 42 to act as and/or assist as a joint, such as assisting in hip movements of the user 16. As such, the first actuator 62 may be an electrically or pneumatically powered motor that rotates to act as and/or assist as the joint between the upper body device 44 and the upper leg device 42. The second actuator 64 may be an electrically or pneumatically powered motor that rotates to act as and/or assist as the joint between the upper leg device 42 and the lower leg device 40.

In some embodiments, a plurality of upper members 98a, 98b are positioned on either side of the first actuator 62 to retain the position of the first actuator 62 between the upper body device 44 and the upper leg device 42. In some embodiments, each of the plurality of upper members 98a, 98b are rigid members to provide additional support to the upper body device 44 and the upper leg device 42. In other embodiments, each of the plurality of upper members 98a, 98b are flexible members to permit independent movement between the upper body device 44 and the upper leg device 42. In other embodiments, the plurality of upper members 98a, 98b are a combination of rigid members and flexible members.

The second actuator 64 is positioned between the upper leg device 42 and the lower leg device 40 to act as joint, such as assisting in knee movements of the user 16. In some embodiments, a plurality of lower members 99a, 99b are positioned on either side of the second actuator 64 to retain the position of the second actuator 64 between the upper leg device 42 and the lower leg device 40. In some embodiments, each of the plurality of lower members 99a, 99b are rigid members to provide additional support to the upper leg device 42 and the lower leg device 40. In other embodiments, each of the plurality of lower members 99a, 99b are flexible members to permit independent movement between the upper leg device 42 and the lower leg device 40. In other embodiments, the plurality of lower members 99a, 99b are a combination of rigid members and flexible members.

It should be understood that the first actuator 62 and the second actuator 64 may be positioned at other locations of the user's body without departing from the scope of the present disclosure. That is, in some embodiments, the first actuator 62 may be positioned anywhere on the exoskeleton 38 to act as and/or assist in joint movements of the user 16, such as the hip, and the second actuator 64 is positioned anywhere on the exoskeleton 38 to act as and/or assist in joint movements of the user 16, such as knee movements.

The lower leg position sensor 66 is communicatively coupled to the control unit 14 and is configured to detect data related to a position of the lower leg device 40 (e.g. whether in a coupled position and/or a released position), the positioning of the second actuator 64 (e.g. location and positioning such as an encoder), the lower leg 19 of the user 16 (e.g. whether the lower leg is in a desirable position within the lower leg device 40), the position of the at least one lower leg member 48 (e.g. whether in the deployed position and/or the retracted position), and/or the like, as discussed in greater detail herein. Each lower leg position sensor 66 may include a laser-based sensor, a proximity sensor, a level detection sensor, a pressure sensor, and/or any combination thereof, or the like. As such, the lower leg position sensor 66 may be positioned at various locations with respect to the user 16 and/or the exoskeleton 38. For example, as depicted in FIGS. 1 and 3, the lower leg position sensor 66 may include at least one sensor positioned at or near the joint and/or another place of movement, such that the movement may be sensed by the lower leg position sensor 66 and corresponding data may be transmitted. Accordingly, the lower leg position sensor 66 may transmit data to the control unit 14 in either the wheelchair mode or in the exoskeleton mode, as discussed in greater detail herein. While the lower leg position sensor 66 is depicted as a single sensor, this is non-limiting and the lower leg position sensor 66 may include a plurality of sensors.

The upper leg position sensor 68 is communicatively coupled to the control unit 14 and is configured to detect data relating to a position of the upper leg device 42 (e.g. whether in a coupled position and/or a released position), the positioning of the first actuator 62 (e.g. location and positioning such as an encoder), the upper leg 18 of the user 16 (e.g. whether the upper leg is in a desirable position within the upper leg device 42), the position of the at least one upper leg member 52 (e.g. whether in the deployed position and/or the retracted position), and/or the like, as discussed in greater detail herein. Each upper leg position sensor 68 may include a laser-based sensor, a proximity sensor, a level detection sensor, a pressure sensor, and/or any combination thereof, or the like. As such, the upper leg position sensor 68 may be positioned at various locations with respect to the user 16 and/or the exoskeleton 38. For example, as depicted in FIGS. 1 and 3, the upper leg position sensor 68 may include at least one sensor positioned at or near the joint and/or another place of movement, such that the movement may be sensed by the upper leg position sensor 68 and corresponding data may be transmitted. Accordingly, the upper leg position sensor 68 may transmit data to the control unit 14 in either the wheelchair mode or in the exoskeleton mode, as discussed in greater detail herein. While the upper leg position sensor 68 is depicted as a single sensor, this is non-limiting and the upper leg position sensor 68 may include a plurality of sensors.

The upper body position sensor 70 is communicatively coupled to the control unit 14 and is configured to detect data relating to a position of the upper body device 44 (e.g. whether in a coupled position and/or a released position), position of the upper body 21 of the user 16 (e.g. whether the stomach, chest and/or back portion is in a desired position within the upper body device 44), the position of the at least one upper body member 54 (e.g. whether in the deployed position and/or the retracted position), and/or the like, as discussed in greater detail herein. Each upper body position sensor 70 may include a laser-based sensor, a proximity sensor, a level detection sensor, a pressure sensor, and/or any combination thereof, or the like. As such, the upper body position sensor 70 may be positioned at various locations with respect to the user 16 and/or the exoskeleton 38. For example, as depicted in FIGS. 1 and 3, the upper body position sensor 70 may include at least one sensor positioned at or near the joint and/or another place of movement, such that the movement may be sensed by the upper body position sensor 70 and corresponding data may be transmitted. Accordingly, the upper body position sensor 70 may transmit data to the control unit 14 in either the wheelchair mode or in the exoskeleton mode, as discussed in greater detail herein. While the upper body position sensor 70 is depicted as a single sensor, this is non-limiting and the upper body position sensor 70 may include a plurality of sensors.

The first actuator 62 is communicatively coupled to the control unit 14 and is configured to assist the user 16 in completing a particular movement by actuating or moving the upper leg device 42 between a plurality of positions, as discussed in greater detail herein. The second actuator 64 is communicatively coupled to the control unit 14 and is configured to assist the user 16 in completing a particular movement by actuating or moving the lower leg device 40 between a plurality of positions, as discussed in greater detail herein.

As such, in various embodiments, the first actuator 62 may be positioned and arranged such that, when the exoskeleton 38 assists the user 16 in completing a movement, the second actuator 64 may move and/or rotate such that the lower leg device 40 of the exoskeleton 38 articulates or moves with respect to the upper leg device 42 and/or the upper body device 44 of the exoskeleton 38 to assist a particular motion or movement (e.g., assisting the user 16 in bending his/her knee). As such, the exoskeleton 38 may be particularly configured in some embodiments to assist the user 16 with a walking motion, a standing motion, and/or a sitting motion. It should be understood that while FIGS. 1 and 3 only depict a single first actuator 62 and a single second actuator 64 and FIGS. 2 and 4 only depict a pair of the first actuator 62 and a pair of the second actuator 64, this is a non-limiting example. That is, the exoskeleton 38 may include a plurality of actuators in some embodiments.

Now referring to FIGS. 1-3, the base 20 may include, but is not limited to, one or more wheels 32, a motor 45, a battery 36, and the control unit 14. The base 20 may raise, tilt, or otherwise move the frame 22, the seat 24, and/or the seat back 25. The control unit 14 may be an electronic control unit and may generally be a control device that controls the wheelchair 12 and/or one or more components thereof (e.g., the first actuator 62, the second actuator 64, the lower leg position sensor 66, the upper leg position sensor 68, and/or the upper body position sensor 70). As such, the control unit 14 may be communicatively coupled to the various components of the wheelchair 12 such that one or more control signals can be transmitted from the control unit 14 to the various components such as the first actuator 62 and the second actuator 64, as described in greater detail herein. The motor 45, which may be configured as one or more motors, is coupled to the wheels 32 to drive movement of the wheels 32. The battery 36 may generally provide electrical power to the various components of the wheelchair 12, such as the motor 45, the first actuator 62, and the second actuator 64, as discussed in greater detail herein. Other components of the base 20 should generally be understood and are not described in further detail herein.

The one or more wheels 32 may be configured as any type of wheel. As a non-limiting example, the one or more wheels 32 may be omni-directional wheels, which may movement of the wheelchair 12 in any direction (e.g., lateral movement or the like) when the wheelchair 12 is in a fine manual motion control, as described in greater detail herein.

The control unit 14 may generally be a standalone control device that contains one or more components for controlling movement of the wheelchair 12 and/or other wheelchair components such as the components of the exoskeleton assembly 37 (e.g., the first actuator 62, the second actuator 64, and the like). It should be appreciated that while the control unit 14 is shown in FIGS. 1-4 as part of the base 20 of the wheelchair 12, this is a non-limiting example. That is, the control unit 14 may be a device that is separate from the base 20, such as a device that is coupled to or integrated with the pair of armrests 26, the seat 24, the seat back 25, and/or the like.

Now referring to FIGS. 1-4, each armrest of the pair of armrests 26 includes an arm pad 72 at least partially circumferentially surrounding a sleeve 74 that is open to a distal end of the arm pad 72. It should be appreciated that the sleeve 74 may be integrally formed within the arm pad 72 of the pair of armrests 26. In the exoskeleton mode, as best seen in FIG. 3, the pair of armrests 26 are released from the elongated member 29 such that the arm pad 72 is used as padding when the user 16 stands from the wheelchair 12. It should be appreciated that each of the pair of armrests 26 include an arm release mechanism 78 that releasably couples the armrest 26 to the elongated member 29.

In some embodiments, the arm release mechanism 78 is a component that mechanically couples the arm pad 72 and sleeve 74 of the pair of armrests 26 to the elongated member 29 of the wheelchair 12. For example, the arm release mechanism 78 may be a fastener such as a hook and loop type, a bolt and nut, a ball lock pin, a connecting pin, and/or the like. As such, in this embodiment, a portion of the arm pad 72 may include a channel 73 or a recess that receives a portion of the elongated member 29 so that the arm pad 72 is supported onto the elongated member 29. In other embodiments, the arm release mechanism 78 may be a bore within the arm pad 72 that allows the arm pad 72 to be slid onto the elongated member 29, may be press fit onto the elongated member 29, and/or the like. In other embodiments, the arm release mechanism 78 is a magnetic component and configured to releasably couple each armrest 26 to the elongated member 29 of the wheelchair 12. It should be appreciated that the strength of the magnet is such that the pair of armrests 26 remain coupled during travel of the wheelchair 12, but may be released upon a request by the user 16. In some embodiments, the user 16 may release the pair of armrests 26 by applying a force to the pair of armrests 26 in a direction opposite of the magnetic forces caused by the magnet. In other embodiments, the user 16 may release the pair of armrests 26 by applying a force to the pair of armrests 26 in a direction transverse to the magnetic forces caused by the magnet. In some embodiments, the magnet of the arm release mechanism 78 is a plurality of magnets. The magnet described herein may be a permanent magnet, a temporary magnet, or the electro-magnet.

Still referring to FIGS. 1-5, in yet other embodiments, the arm release mechanism 78 is electro-magnetic component and configured to releasably couple each of the pair of armrests 26 to the elongated member 29 of the wheelchair 12. It should be appreciated that the strength of the magnet is such that the pair of armrests 26 remain coupled during travel of the wheelchair 12, but may be released upon a request by the user 16. In some embodiments, the control unit 14 may be communicatively coupled to the arm release mechanism 78 of each armrest 26 to transmit signals to the arm release mechanism 78 to cause each armrest 26 to release from the elongated member 29 of the wheelchair 12 and vice versa according to the inputs received by the control unit 14. In some embodiments, the control unit 14 may be used to receive inputs from the user 16. In other embodiments, a button 33, switch, voice control, breath control, and/or the like may be utilized to receive inputs from the user 16.

Referring to FIGS. 2 and 3, the sleeve 74 further houses a plurality of telescoping segments 80. Each segment of the plurality of telescoping segments 80 have a different inner diameter such that each segment is nested into an adjacent segment when in the retracted state such each segment of the plurality of telescoping segments 80 fits within the sleeve 74. Further, in embodiments, the lowermost segment of the plurality of telescoping segments 80 may include a stopper portion 81 configured to engage with the surface 82 when using the pair of armrests 26 as an assist device. The stopper portion 81 may be a rubber material, a ceramic material, a metal material, and the like such that the stopper portion 81 provides an anti-slip or creates friction between the plurality of telescoping segments 80 and the surface 82. As such, it should be appreciated that the contact between the stopper portion 81 and the surface 82 occurs when the wheelchair system 10 is in the exoskeleton mode. It should also be appreciated that the length of the plurality of telescoping segments 80 is customizable for each user 16 to predetermined heights in the system vertical direction (i.e., in the +/−Z direction).

In some embodiments, the plurality of telescoping segments 80 may be extended mechanically by the user 16. In these embodiments, the plurality of telescoping segments 80 may be held in the sleeve 74 by a screw lock. That is, the sleeve 74 may include a threaded portion and the uppermost segment of the plurality of telescoping segments 80 includes a fitting that may be rotated or screwed in one direction onto the threaded portion to lock the plurality of telescoping segments 80 into the sleeve 74 or rotated in an opposite direction to release the plurality of telescoping segments 80 from the sleeve 74. In other embodiments, the plurality of telescoping segments 80 may be extended by the user 16 using pneumatics, hydraulics, and the like.

In some embodiments, an arm actuator 76 is positioned within each armrest 26. In other embodiments, the arm actuator 76 is positioned somewhere other than within the pair of armrests 26. The arm actuator 76 is coupled to the plurality of telescoping segments 80 to extend or retract the plurality of telescoping segments 80 in the system vertical direction (i.e., in the +/−Z direction) based on a received input from the user 16. The arm actuator 76 may be powered by the battery 36 of the wheelchair 12. That is, the plurality of telescoping segments 80 may be extended and/or retracted without the need to be connected to elongated member 29 of the wheelchair 12. In some embodiments, the control unit 14 may be communicatively coupled to the arm actuator 76 to transmit signals to the arm actuator 76 to cause the plurality of telescoping segments 80 to extend and/or retract in the system vertical direction (i.e., in the +/−Z direction) according to the inputs transmitted by the control unit 14. In some embodiments, a button 88 may be used to receive inputs from the user 16. In other embodiments, a toggle switch, a switch, and/or the like may be utilized to receive inputs from the user 16. Further, in some embodiments, the button 88, switch, and/or the like may be positioned on one of the pair of armrests 26 and communicated to the other one of the pair of armrests 26, or on both of the pair of armrests 26, and/or remotely controlled.

Still referring to FIGS. 1 and 3, in various embodiments, the armrest 26 may include at least one arm sensor 90 that may transmit a plurality of outputs, either wired or wirelessly, to the control unit 14, as explained in greater detail herein. The at least one arm sensor 90 may be a laser-based sensor, a proximity sensor, a level detection sensor, a pressure sensor, any combination thereof, and/or any other type of sensor that can detect a position of the armrest 26, an arm of the user 16, a position of the plurality of telescoping segments 80, and the like. In various embodiments, the at least one arm sensor 90 may be positioned to communicate the position of the plurality of telescoping segments 80, such as whether the plurality of telescoping segments 80 are in the extended or retracted position with respect to the sleeve 74 of the armrest 26.

Each armrest 26 may include an arm supporting member 91. For example, the arm supporting member 91 may be a strap, an elastic band, a belt, rigid plastic, a brace, and the like. As such, the arm supporting member 91 is movable between a deployed position, where the arm supporting member 91 is positioned over the arm of the user 16 and an opposite retracted position. Further, in some embodiments, the sleeve 74 may include a handle 84 that rotates between a stowed position and a use position. In the use position, the handle 84 extends outwardly from an exterior surface of the sleeve 74 in a direction transverse to the plurality of telescoping segments 80. In the stowed position, the handle 84 may extend upwardly in the system vertical direction (i.e., in the +/−Z direction) along the exterior surface of the sleeve 74 in a direction parallel to the plurality of telescoping segments 80. It should be appreciated that the handle 84 may provide additional support to a hand of the user when the pair of armrests 26 are being used as an assisting device, as best seen in FIG. 5.

Now referring to FIG. 3, the wheelchair assembly further includes a cable 92 that extends between the exoskeleton assembly 37 and the wheelchair 12. In some embodiments, the cable 92 may be a component of the wheelchair 12. In other embodiments, the cable 92 may be a component of the exoskeleton 38. The cable 92 communicatively couples the components of the exoskeleton 38 (e.g., first actuator 62, the second actuator 64, the arm actuator 76, and the like) to the control unit 14. That is, the cable 92 is configured to transmit and receive control signals from the control unit 14, data from the various sensors (e.g., the lower leg position sensor 66, the upper leg position sensor 68, the upper body position sensor 70, the at least one arm sensor 90, and the like), and/or electrical power from the battery 36. The cable 92 is movable between a retracted position and an extended position, as best seen in FIG. 5. When the cable 92 is in the extended position, the wheelchair system 10 is in the exoskeleton mode, as best seen in FIG. 3. When the cable 92 is in the retracted position, the wheelchair system 10 is in the wheelchair mode, as best seen in FIG. 1. As such, the seat back 25 may include a cable receiving portion 94 that reels, collects, stores, gathers, winches, and/or the like, the cable 92 between a plurality of positions between the retracted position and the extended position.

It should be understood that the cable 92 is communicatively coupled to the various components of both the exoskeleton 38 (e.g. the first actuator 62, the second actuator 64, and the like) and the various components of the wheelchair 12 (e.g. the battery 36, the control unit 14, and the like) in the retracted and extended positions and the plurality of positions therebetween. That is, the cable 92 tethers the exoskeleton 38 to the wheelchair 12 so that the components of the exoskeleton 38 are continuously powered by the components of the wheelchair 12 via the cable 92.

In some embodiments, the cable receiving portion 94 includes a cable detection sensor to determine the tension on the cable 92 and/or a length of the cable that is extended from the cable receiving portion. As such, the cable receiving portion 94 may determine when there is slack in the cable 92 and/or the maximum distance of the cable 92 is not yet extended (i.e., the exoskeleton 38 is in a close proximately to the wheelchair 12) or when there is a high tension and/or the maximum distance of the cable 92 is achieved (i.e., the exoskeleton 38 is in further away from the wheelchair 12 when compared to when there is slack in the cable 92). As such, when it is determined that the cable 92 is in the extended position and the exoskeleton 38 continues to advance in a direction opposite of the wheelchair 12, the wheelchair 12 may move in the same direction as the exoskeleton 38 in a coordinated movement to allow the user

16 to continue performing the plurality of standing tasks. That is, the wheelchair 12 will maintain the extended position of the cable 92 between the exoskeleton 38 and the wheelchair 12.

In some embodiments, the cable 92 and the cable receiving portion 94 may function together to assist in retrieving the exoskeleton 38, and the user 16, from a position independent of the wheelchair 12. For example, should the user 16, while in the exoskeleton 38, not be able to walk back to the wheelchair 12 (e.g., the user 16 has fallen, the user 16 is sitting on a floor or other surface and cannot stand, the user 16 cannot walk, and/or the like), the cable receiving portion 94 may act as a winch to assist the user 16 in getting back to the wheelchair 12.

Referring to FIGS. 1-4 and 5A, various illustrative components of the control unit 14 are schematically depicted. In various embodiments, the control unit 14 a network interface 506, a processing device 502, a data storage device 510, an input module 504 and a memory component 508. The processing device 502, such as a computer processing unit (CPU), may be the central processing unit of the control unit 14, performing calculations and logic operations to execute a program. The processing device 502, alone or in conjunction with the other components, is an illustrative processing device, computing device, processor, or combination thereof. The processing device 502 may include any processing component configured to receive and execute instructions (such as from the memory component 508). A local interface 512, such as a bus or the like, may interconnect the various components.

In some embodiments, the memory component 508 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 508 may be a non-transitory, processor-readable memory. The memory component 508 may include one or more programming instructions thereon that, when executed by the processing device 502, cause the processing device 502 to complete various processes, such as one or more of the processes described herein with respect to FIG. 6.

Figure 5A:
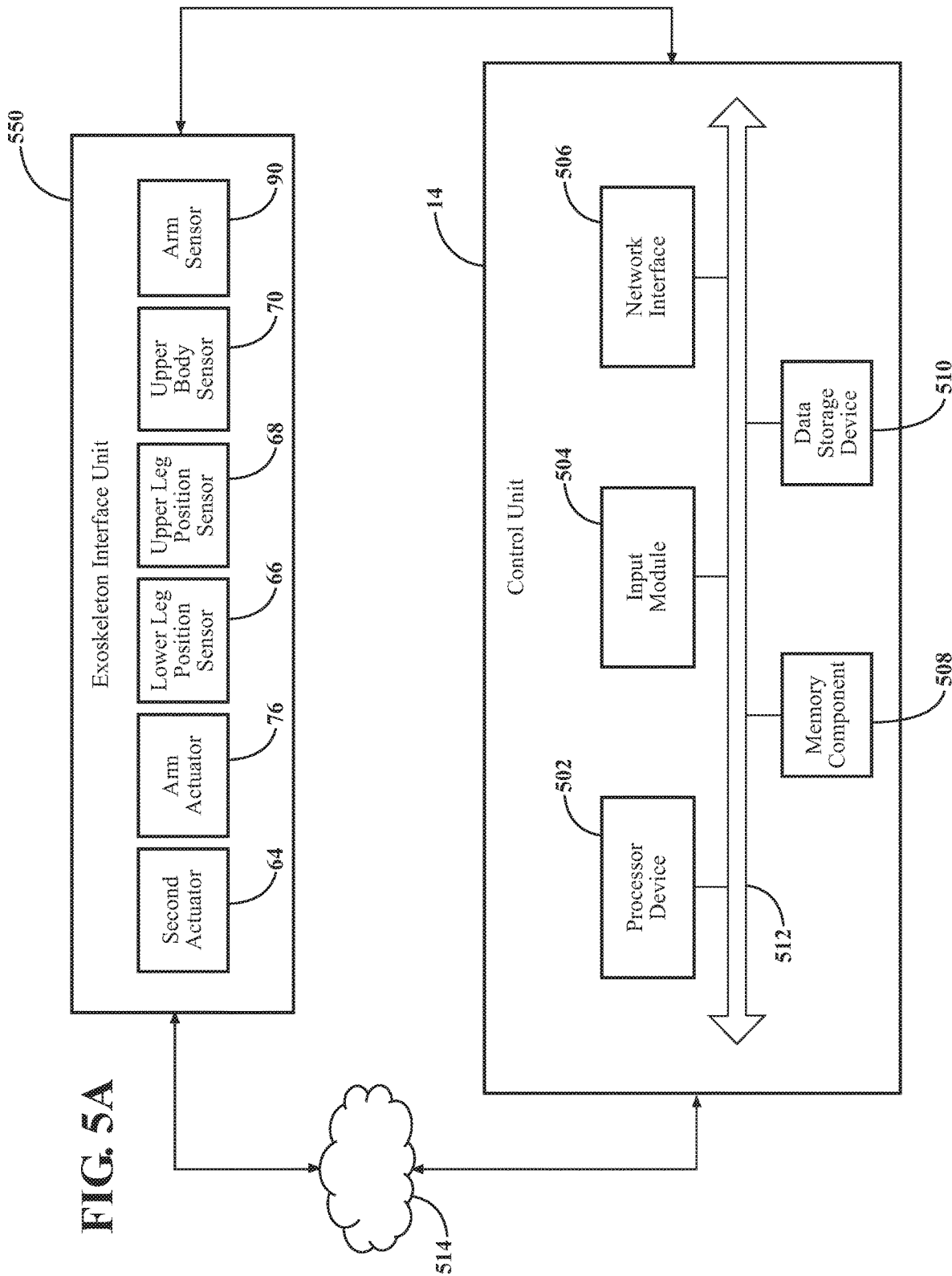
FIG. 5A schematically depicts illustrative internal components of an example control unit of a wheelchair system according to one or more embodiments described and illustrated herein.
Figure 5B:
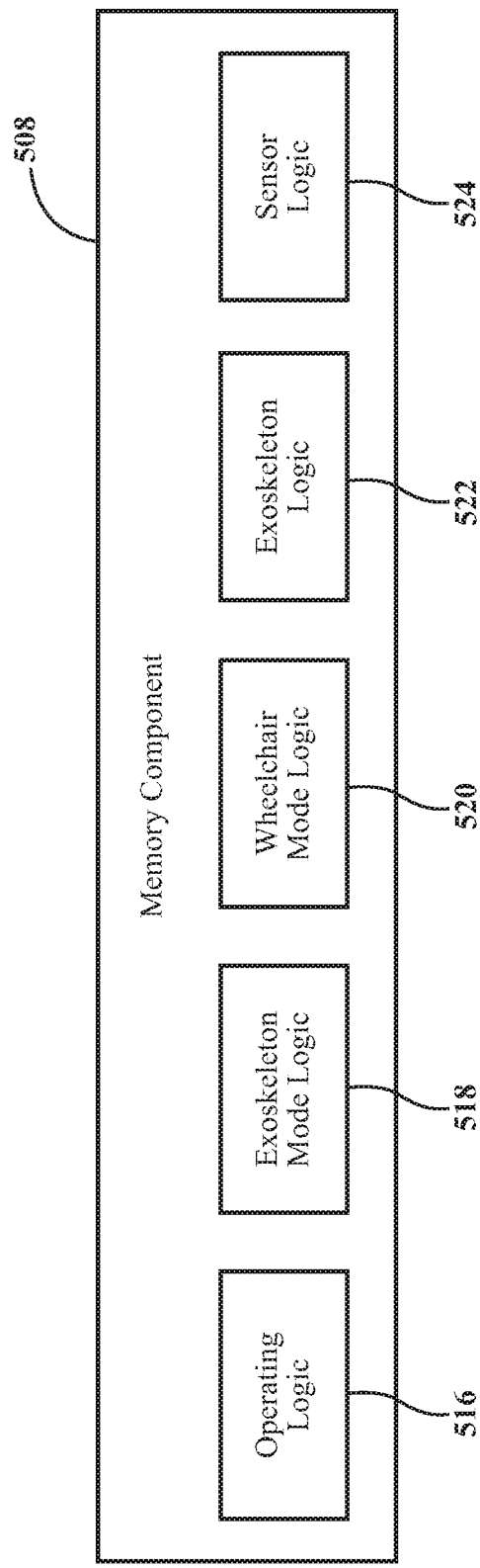
FIG. 5B schematically depicts logic modules of an example memory component of the example wheelchair system of FIG. 5A according to one or more embodiments described and illustrated herein.

Referring to FIG. 5B, the programming instructions stored on the memory component 508 may be embodied as one or more software logic modules, where each logic module provides programming instructions for completing one or more functions, such as the functions described in greater detail below with respect to FIG. 6. For instance, a wheelchair operating logic module 516 may include one or more different pieces of logic, each of which may be embodied as a computer program, firmware, and/or software/hardware, which may be executable by the processing device 502 to cause the wheelchair 12 to move and/or move in accordance with commands provided by the user 16.

An exoskeleton mode logic module 518 may include one or more pieces of logic, each of which may be embodied as a computer program, firmware, and/or software/hardware, which may be executable by the processing device 502 to release the components of the exoskeleton assembly 37 from the wheelchair 12 to provide support and/or assist the user 16 to perform the plurality standing tasks independent from the wheelchair 12. A wheelchair mode logic module 520 may include one or more pieces of logic, each of which may be embodied as a computer program, firmware, and/or software/hardware, which may be executable by the processing device 502 to couple the components of the exoskeleton assembly 37 to the wheelchair 12 such that the components of the exoskeleton assembly 37 are integrated within the wheelchair 12.

An exoskeleton logic module 522 may include one or more pieces of logic, each of which may be embodied as a computer program, firmware, and/or software/hardware, which may be executable by the processing device 502 to actuate the various components of the exoskeleton assembly 37 such as the first actuator 62, the second actuator 64, the arm actuator 76, and the like. A sensor logic module 524 may include one or more pieces of logic, each of which may be embodied as a computer program, firmware, and/or software/hardware, which may be executable by the processing device 502 to receive a process signals and/or data from one or more sensors, such as the sensors illustrated in FIGS. 1-4.

Referring once again to FIG. 5A, the input module 504 is provided to enable the user 16 to input controls into the control unit 14 and thus the wheelchair 12. The input module 504 may be communicatively coupled to the user interface device 28 and/or another input device (e.g., button 33), as described in more detail below. The input module 504 may communicate input signals to the processing device 502, for example, such that the user 16 may request for the wheelchair system 10 to move between the exoskeleton mode and the wheelchair mode. Thus, it should be appreciated that the user controls, as discussed in greater detail herein, may be transmitted to the control unit 14 through the input module 504. Further, it should be appreciated that the user 16 may select the user controls by a button, such as a push button, a switch, such as a toggle switch, and the like on the wheelchair 12 including from on the hand rest 31, pair of armrests 26 or from a program selection initiated at an external device such as a portable computing device, smartphone, or the like by way of the network interface described below 506.

The network interface 506 of the control unit 14 may include any wired or wireless networking hardware, such as a modem, LAN port, wireless fidelity (Wi-Fi) card, WiMax card, mobile communications hardware, and/or other hardware for communicating with other networks and/or devices. Therefore, the communication between the control unit 14, the wheelchair 12, and/or other external devices, such as the sensors of the exoskeleton 38 (e.g., the upper leg position sensor 68, lower leg position sensor 66, upper body position sensor 70, at least one arm sensor 90, and the like) may be provided through the network interface 506. In some embodiments, the network interface 506 may communicatively couple the control unit 14 to an exoskeleton interface unit 550 via the cable 92 (FIG. 3). In other embodiments, the network interface 506 may communicatively couple the control unit 14 to the exoskeleton interface unit 550 via a network 514. The network 514 may include a wide area network (WAN), such as the Internet, a local area network (LAN), a mobile communications network, a public service telephone network (PSTN), a personal area network (PAN), a metropolitan area network (MAN), a virtual private network (VPN), and/or another network that can electronically connected the control unit 14 to other components.

The data storage device 510, which may generally be a storage medium, may contain one or more data repositories for storing data that is received and/or generated, and may be any physical storage medium, including, but not limited to, a hard disk drive (HDD), memory, removable storage, and/or the like. While the data storage device 510 is depicted as a local device, it should be understood that the data storage device 510 may be a remote storage device, such as, for example, a server computing device or the like. Illustrative data that may be contained within the data storage device 510 is described below with respect to FIG. 5C and includes, but is not limited to, first actuator data 526, second actuator data 528, arm actuator data 530, wheelchair actuator data 532, lower leg position sensor data 534, upper leg position sensor data 536, upper body position sensor data 538, arm sensor data 540, and wheelchair sensor data 542.

Still referring to FIG. 5A, various illustrative internal components of the exoskeleton interface unit 550 communicatively coupled to the control unit 14 will be discussed. More specifically, the exoskeleton interface unit 550 may be communicatively coupled to the network interface 506 of the control unit 14 via the cable 92 (FIG. 3) and/or the network 514. In various embodiments, the exoskeleton interface unit 550 may include, but is not limited to, the lower leg position sensor 66 operable to produce and transmit data which is stored in the control unit 14 as the lower leg position sensor data 534. The lower leg position sensor 66 may produce and transmit data that is indicative of the position of the lower leg device 40 (e.g. whether in a coupled position and/or a released position), the positioning of the second actuator 64 (e.g. location and positioning such as an encoder), the lower leg 19 of the user 16 (e.g. whether the lower leg is properly within the lower leg device 40), the position of the at least one lower leg member 48 (e.g. whether in a deployed position and/or a retracted position), and/or the like, as discussed in greater detail herein.

Some embodiments include the upper leg position sensor 68 operable to produce and transmit data which is stored in the control unit 14 as the upper leg position sensor data 536. The upper leg position sensor 68 may produce and transmit data that is indicative of the position of the upper leg device 42 (e.g. whether in a coupled position and/or a released position), the positioning of the first actuator 62 (e.g. location and positioning such as an encoder), the upper leg 18 of the user 16 (e.g. whether the upper leg is properly within the upper leg device 42), the position of the at least one upper body member 54 (e.g. whether in a deployed position and/or a retracted position), and/or the like, as discussed in greater detail herein.

Some embodiments include the upper body position sensor 70 operable to produce and transmit data which is stored in the control unit 14 as the upper body position sensor data 538. The upper body position sensor 70 may produce and transmit data that is indicative of the position of the upper body device 44 (e.g. whether in a coupled position and/or a released position), the position of the upper body 21 of the user 16 (e.g. whether the stomach, chest and/or back portion is in a desired position within the upper body device 44), the position of the at least one upper body member 54 (e.g. whether in the deployed position and/or the retracted position), and/or the like, as discussed in greater detail herein.

Some embodiments include the at least one arm sensor 90 operable to produce and transmit data which is stored in the control unit 14 as the arm sensor data 540. The at least one arm sensor 90 may produce and transmit data that is indicative of the position of the armrest 26, the arm of the user 16 (e.g. whether the arm is properly within the armrest 26), the position of the arm supporting member 91 (e.g. whether in a deployed position and/or a retracted position), and/or the like, as discussed in greater detail herein.

Figure 5C:
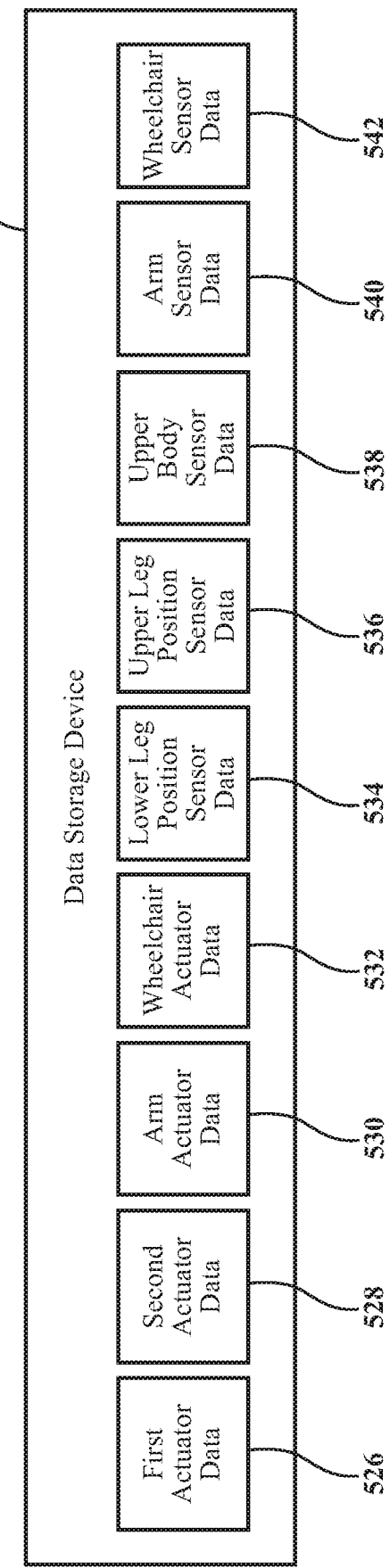
FIG. 5C schematically depicts example data stored within an example data storage device of the example wheelchair system of FIG. 5A according to one or more embodiments described and illustrated herein.

Referring now to FIG. 5C, the data storage device 510 of the control unit 14 may store data as a result of performing the functionalities described herein and/or data that is usable to perform the functionalities described herein, moving the wheelchair system between the exoskeleton mode and the wheelchair mode and by providing the user 16 with the exoskeleton assembly 37 to provide support to assist the user 16 in performing the plurality of standing tasks. Embodiments may include some, all, or more than the data depicted in FIG. 5C. For example, the wheelchair sensor data may include data provided by a plurality of sensors positioned on the wheelchair that transmit data related to the wheelchair functionality (e.g. position of the seat 24, position of the seat back 25, and the like). Further, the wheelchair actuator data 532 may be data relating to the motor 45.

Referring once again to FIGS. 1-4, the user 16 of a wheelchair 12 may use the exoskeleton assembly 37 to assist the user 16 in performing a plurality of standing tasks while the exoskeleton assembly 37 is tethered to the wheelchair so that the various components of the exoskeleton assembly 37 are powered by the battery 36 and controlled by the control unit 14 of the wheelchair 12. For example, the exoskeleton assembly 37 may assist the user 16 in standing, in removing and/or placing items on an elevated shelf, in walking, and the like.

Referring now to FIG. 6, an example method of moving the wheelchair 12 between the wheelchair mode and the exoskeleton mode to assist the user 16 in performing a plurality of standing tasks is illustrated by a flowchart 600. The user may wish to enable the exoskeleton assembly 37 by using an input device (e.g., a button 33, switch, the user interface device 28, or any other input device) at block 605. It should be understood that the user may enable/disable the exoskeleton mode at any time, and he or she does not need to orientate or position the wheelchair 12 in any special arrangement or orientation.

In some embodiments, the wheelchair 12 may automatically enable/disable the exoskeleton mode without a user input. In such embodiments, the exoskeleton assembly 37 may detect the user 16 attempting to transition between the seating position to a standing position determined by using a plurality of sensors (e.g., lower leg position sensor 66, upper leg position sensor 68, upper body position sensor 70 and/or at least one arm sensor 90). For example, the exoskeleton assembly 37 may determine when the user 16 is trying to pull away from the wheelchair 12 to stand and/or perform other tasks.

After receiving the user input, a position of the body of the user is determined at block 610. The position of the body of the user may be determined by using a plurality of sensors (e.g., lower leg position sensor 66, upper leg position sensor 68, upper body position sensor 70 and/or at least one arm sensor 90), as described above. The wheelchair system 10 determines whether the body of the user 16 is in a desired position at block 615. If the wheelchair system 10 determines that the body of the user 16 is not in a desired position, then the user may be notified to reposition into the desired position, at block 620. It should be appreciated that the user 16 may be notified to readjust via a sound, a visual indicator, and/or the like. Further, it should be appreciated that reposition may be notifying the user 16 to move the body of the user 16 or a particular body part into a desired position. It should be understood that blocks 610-620 may continuously repeat until the body of the user is in a desirable position. Once the body of the user 16 is in the desired position, as determined at block 615, the position of the resilient members (e.g., the at least one lower leg member 48, the at least one upper leg resilient member 52, the at least one upper body member 54, the arm supporting member 91, and the like) is determined at block 625.

If the position of the resilient members is determined to be not be in the deployed position (i.e., in the retracted position), at block 630, the wheelchair system 10 notifies the user 16 to place each of the resilient members in the deployed position, at block 635. The notification may be via a sound, a visual indicator, and/or the like. It should be understood that blocks 625-635 may continuously repeat until all the resilient members are in the deployed position. If the position of the resilient members is determined to be in the deployed position at block 630, the wheelchair system 10 may raise the base 20, which in turn raises the seat 24 and/or the seat back 25 in the system vertical direction (i.e., in the +Z direction) and may tilt the seat 24 and/or the seat back 25 in the system longitudinal direction (i.e., in the +/−X direction), at block 640, and release the exoskeleton assembly 37 (e.g. the exoskeleton 38 and the pair of armrests 26) from the wheelchair 12, at block 645. It should be appreciated that the arm release mechanism 78 is actuated to release the armrest 26 from the elongated member 29. It should be understood that blocks 630-640 may continuously repeat until the exoskeleton assembly 37 is released from the wheelchair 12. Once in the released position, the pair of armrests 26 may be extended, at block 650, to assist the user 16 in performing the plurality of standing tasks. The illustrative method 600 ends at block 655. It should be understood that the inverse steps of the illustrative method 600 of FIG. 6 may be performed to couple the exoskeleton assembly 37 to the wheelchair 12.

It should now be understood that the systems and methods described herein provide a system that includes a wheelchair and an exoskeleton assembly that are movable between a wheelchair mode and an exoskeleton mode. The wheelchair mode permits a use of the wheelchair. The exoskeleton mode permits the user to utilize the exoskeleton to perform a plurality of standing tasks independent from the wheelchair using a power source and a control unit of the wheelchair via a cable tethered to the exoskeleton.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wheelchair system, comprising:
    a wheelchair comprising:
        a frame,
        a pair of armrests coupled to the frame, the pair of armrests movable between an attached position and a detached position, wherein when in the attached position, each one of the pair of armrests are coupled to the frame and when in the detached position, each one of the pair of armrests is removed from the frame, and
        a control unit; and
    an exoskeleton communicatively coupled to the control unit via a cable extending between the exoskeleton and the control unit, the exoskeleton being releasably coupled to at least a portion of the frame of the wheelchair,
    wherein the wheelchair system is translatable between a wheelchair mode and an exoskeleton mode such that, when in the exoskeleton mode, the control unit provides electrical power and control signals to the exoskeleton such that the exoskeleton assists a user in standing away from the wheelchair.

2. The wheelchair system of claim 1, wherein the cable is retractable such that the cable is in a retracted position when the wheelchair system is in the wheelchair mode and in an extended position when the wheelchair system is in the exoskeleton mode.

3. The wheelchair system of claim 1, wherein:
    the wheelchair further includes a seat coupled to the frame, and
    in the exoskeleton mode, the seat moves in a system vertical direction to raise the user to assist the user to stand from a sitting position.

4. The wheelchair system of claim 1, wherein:
    the exoskeleton further comprises:
        an upper body device positioned on an upper body of the user;
        an upper leg device positioned on an upper leg of the user; and
        at least one actuator positioned between the upper body device and the upper leg device, the at least one actuator acts as a joint to assist in moving the upper leg device with respect to the upper body device such that the user stands away from the wheelchair.

5. The wheelchair system of claim 4, wherein the at least one actuator of the exoskeleton is communicatively coupled to the control unit via the cable.

6. The wheelchair system of claim 4, wherein:
    the exoskeleton further comprises:
        a lower leg device positioned on a lower leg of the user; and
        a second actuator positioned between the upper leg device and the lower leg device, the second actuator acts as a joint to assist in moving the lower leg device with respect to the upper leg device such that the user may stand away from the wheelchair.

7. The wheelchair system of claim 6, wherein at least a portion of the upper body device, the upper leg device, and the lower leg device are releasably coupled to the frame of the wheelchair when the wheelchair system is in the wheelchair mode.

8. The wheelchair system of claim 1, wherein the control unit receives an input from the user and the control unit coordinates movements between the wheelchair and the exoskeleton based on the input.

9. The wheelchair system of claim 1, wherein each one of the pair of armrests are coupled to the frame in the attached position and each one of the pair of armrests are removed from the frame in the detached position to assist the user in standing away from the wheelchair.

10. The wheelchair system of claim 1, wherein each one of the pair of armrests include a plurality of telescoping sections, the plurality of telescoping sections are telescopically adjustable.

11. A wheelchair system, comprising:
    a wheelchair comprising:
        a frame, and
        a control unit,
    an exoskeleton communicatively coupled to the control unit via a cable extending between the exoskeleton and the control unit, the exoskeleton being releasably coupled to at least a portion of the frame of the wheelchair, the exoskeleton comprising:
        an upper body device positioned on an upper body of a user;
        an upper leg device positioned on an upper leg of the user; and at least one actuator positioned between the upper body device and the upper leg device, the at least one actuator acts as a joint to assist in moving the upper leg device with respect to the upper body device such that the user may stand away from the wheelchair, wherein the wheelchair system is translatable between a wheelchair mode and an exoskeleton mode such that, when in the exoskeleton mode, the control unit provides electrical power and control signals to the exoskeleton such that the exoskeleton assists the user in standing away from the wheelchair.

12. The wheelchair system of claim 11, wherein:
the wheelchair further includes a pair of armrests coupled to the frame, the pair of armrests movable between an attached position and a detached position, wherein when in the attached position, each one of the pair of armrests are coupled to the frame and when in the detached position, each one of the pair of armrests is removed from the frame.

13. The wheelchair system of claim 12, wherein each one of the pair of armrests are coupled to the frame in the attached position and each one of the pair of armrests are removed from the frame in the detached position to assist the user in standing away from the wheelchair.

14. The wheelchair system of claim 11, wherein:
the exoskeleton further includes a lower leg device releasable coupled to at least a portion of the frame;
an second actuator coupled to the lower leg device and communicatively coupled to the cable such that the cable provides electrical power and control signals to the second actuator, the second actuator and the lower leg device are each independently operable from the wheelchair.

15. The wheelchair system of claim 11, wherein:
the wheelchair further includes a seat coupled to the frame, and
in the exoskeleton mode, the seat moves in a system vertical direction to raise the user to assist the user to stand from a sitting position.

16. The wheelchair system of claim 11, wherein the control unit receives an input from the user and the control unit coordinates movements between the wheelchair and the exoskeleton based on the input.

17. The wheelchair system of claim 11, wherein:
the exoskeleton further comprises:
a lower leg device positioned on a lower leg of the user; and
a second actuator positioned between the upper leg device and the lower leg device, the second actuator acts as a joint to assist in moving the lower leg device with respect to the upper leg device such that the user may stand independently from the wheelchair.

18. The wheelchair system of claim 16, wherein at least a portion of the upper body device, the upper leg device, and the lower leg device are releasably coupled to the frame of the wheelchair when the wheelchair system is in the wheelchair mode.

19. A method of controlling a wheelchair system between a wheelchair mode and an exoskeleton mode, the method comprising:
receiving, by a control unit, an input from a user, the input corresponding to a particular function;
causing, by a processing device, a wheelchair to move into the exoskeleton mode;
detaching, by the user, a pair of armrests from a frame of the wheelchair; and
causing, by the processing device, at least one actuator of an exoskeleton to move to assist the user in standing away from the wheelchair,
wherein the exoskeleton is tethered to the wheelchair via a cable such that the wheelchair supplies electrical power and control signals to the at least one actuator of the exoskeleton.

20. The method of claim 19, the wheelchair and the exoskeleton move together to supply a control and the power to the user standing independent from the wheelchair.

* * * * *

UNITED STATES PATENT AND TRADEMARK OFFICE
CERTIFICATE OF CORRECTION

| | | |
|---|---|---|
| PATENT NO. | : 11,786,425 B2 | Page 1 of 1 |
| APPLICATION NO. | : 16/916960 | |
| DATED | : October 17, 2023 | |
| INVENTOR(S) | : Dario Jose Villarreal Suarez | |

It is certified that error appears in the above-identified patent and that said Letters Patent is hereby corrected as shown below:

In the Specification

In Column 4, Line(s) 15, after "member", delete "is" and insert --in--, therefor.

Signed and Sealed this
Fifth Day of December, 2023

Katherine Kelly Vidal
*Director of the United States Patent and Trademark Office*